United States Patent
Lee et al.

(10) Patent No.: US 10,926,670 B2
(45) Date of Patent: Feb. 23, 2021

(54) VEHICLE AND METHOD FOR CONTROLLING THE SAME

(71) Applicants: Hyundai Motor Company, Seoul (KR); Kia Motors Corporation, Seoul (KR); Das Co., Ltd., Gyeongsangbuk-do (KR)

(72) Inventors: Sang-Soo Lee, Gunpo (KR); Hyeong Jun Kim, Anyang (KR); Incheol Bae, Incheon (KR); Deok Soo Lim, Hwaseong (KR); Younggwan Kwon, Suwon (KR); Hosuk Jung, Hwaseong (KR); Sanghyun Lee, Anyang (KR); YoungBok Sung, Hwaseong (KR); Sang Ho Kim, Incheon (KR); Tae Jun Kwon, Incheon (KR); Yohan Kim, Ansan (KR); Doori Kim, Goyang (KR); Duck Yeol Kim, Hwaseong (KR); Jae Hyun Kim, Yongin (KR); Sang Young Park, Ansan (KR)

(73) Assignees: Hyundai Motor Company, Seoul (KR); Kia Motors Corporation, Seoul (KR); Das Co., Ltd., Gyeongsangbuk-do (KR)

( * ) Notice: Subject to any disclaimer, the term of this patent is extended or adjusted under 35 U.S.C. 154(b) by 116 days.

(21) Appl. No.: 16/195,197

(22) Filed: Nov. 19, 2018

(65) Prior Publication Data
US 2020/0017000 A1    Jan. 16, 2020

(30) Foreign Application Priority Data
Jul. 12, 2018   (KR) .......................... 10-2018-0081276

(51) Int. Cl.
| B60N 2/22 | (2006.01) |
| B60N 2/02 | (2006.01) |
| A61G 5/00 | (2006.01) |

(52) U.S. Cl.
CPC ............ *B60N 2/22* (2013.01); *B60N 2/0232* (2013.01); *B60N 2/0244* (2013.01); *B60N 2002/0272* (2013.01)

(58) Field of Classification Search
CPC ...... B60N 2/22; B60N 2/0232; B60N 2/0245; A47C 1/034; A47C 1/0347; A47C 1/0352; A61G 5/00
(Continued)

(56) References Cited

U.S. PATENT DOCUMENTS 5,097,185 A  *  3/1992  Ogasawara ............. H02P 7/285
                                                        318/257
5,977,732 A  *  11/1999  Matsumoto .......... H02H 7/0851
                                                        318/283

(Continued)

FOREIGN PATENT DOCUMENTS

| DE | 19737269 A1 | 3/1999 |
| JP | 3733129 B2 | 1/2006 |
| KR | 101297528 B1 | 8/2013 |

*Primary Examiner* — Tan Q Nguyen
(74) *Attorney, Agent, or Firm* — Mintz Levin Cohn Ferris Glovsky and Popeo, P.C.; Peter F. Corless

(57) ABSTRACT

A vehicle and a method controlling the same are provided to detect a seat jamming or a short-circuit of a seat control system. The vehicle includes a motor that rotates forward or backward to fold a seatback of a seat toward a seat cushion or unfold the seatback from the seat cushion. A current sensor sense an output current of the motor and a controller determine a seat jamming or a short-circuit of an output of the motor based on a magnitude of the output current sensed for a predetermined period of time during forward or backward rotation of the motor.

16 Claims, 14 Drawing Sheets

(58) Field of Classification Search
USPC .......................................................... 701/49
See application file for complete search history.

(56) References Cited

U.S. PATENT DOCUMENTS

| | | | | |
|---|---|---|---|---|
| 6,320,341 | B1* | 11/2001 | Oka | B60N 2/0232 |
| | | | | 318/466 |
| 6,752,463 | B2* | 6/2004 | Nivet | B60N 2/0224 |
| | | | | 297/330 |
| 6,949,904 | B2* | 9/2005 | Rumney | B60N 2/002 |
| | | | | 318/286 |
| 7,425,038 | B2 | 9/2008 | Deptolla | |
| 7,823,972 | B2* | 11/2010 | Browne | B60N 2/20 |
| | | | | 297/217.2 |
| 7,950,715 | B2* | 5/2011 | Ishikura | B60N 2/002 |
| | | | | 296/68.1 |
| 8,193,746 | B2* | 6/2012 | Jimenez Pino | B60N 2/0244 |
| | | | | 318/270 |
| 2002/0008483 | A1* | 1/2002 | Kaeufl | G01P 3/489 |
| | | | | 318/280 |
| 2008/0009989 | A1* | 1/2008 | Kim | B60N 2/0232 |
| | | | | 701/36 |
| 2009/0039812 | A1* | 2/2009 | Sone | B60N 2/0244 |
| | | | | 318/434 |
| 2015/0375865 | A1* | 12/2015 | Fischer | B60N 2/77 |
| | | | | 701/49 |

* cited by examiner

FOLDING

UNFOLDING

VEHICLE AND METHOD FOR CONTROLLING THE SAME

CROSS-REFERENCE TO RELATED APPLICATION

This application is based on and claims priority under 35 U.S.C. § 119 to Korean Patent Application No. 10-2018-0081276, filed on Jul. 12, 2018, the disclosure of which is incorporated herein by reference.

BACKGROUND

1. Field of the Disclosure

The present disclosure relates to a vehicle and a method of controlling the same, and more specifically, to a technique for determining a seat jamming or a short-circuit of a seat control system during folding or unfolding or a seat, and adjusting the speeds of seat folding, seat unfolding, and reclining.

2. Description of the Related Art

A vehicle refers to an apparatus that transports a person or an object to a destination and may be moved to various positions mainly using one or more wheels installed on the vehicle body. Such a vehicle may include a three-wheeled or four-wheeled vehicle, a two-wheeled vehicle, such as a motorcycle, and a train traveling on a railway arranged on a construction machine, a bicycle, or a track. Most passenger vehicles are provided with a one-row of rear seats behind a front seat, but a utility vehicle, such as a sport utility vehicle (SUV), may include rear seats in two or more rows.

Generally, such a vehicle seat is divided into a manual type seat in which a driver manually lifts a lever provided on the bottom of the seat and then moves the seat forward/backward to adjust the seat according to body characteristics, an automatic type seat in which a driver engages a seat adjustment button provided around the seat to rotate a motor in a direction that corresponds to the engaged seat adjustment button to move the seat forward and backward, and a memory automatic type seat in which a driver moves the seat forward/backward and sets a desired height and angle of the seat, and then the position, height, and angle of the seat are stored to match to a particular button, and even when the position of the seat is changed later, engaging the button causes the motor to be driven to move the seat to the position corresponding to the stored position information, and the seat and the seatback are automatically adjusted to the height and angle corresponding to the stored height information and the angle information.

The vehicle seat may be adjusted to fold the seatback toward a seat cushion, or unfolded, and the seatback may be adjusted to be reclined by a predetermined angle with respect to a predetermined position. In recent years, there has been an increasing need to detect occurrence of a seat jamming or a short-circuit of a seat folding while the seat is being folded or unfolded. In addition, the importance of research to adjust the speed of seat folding, unfolding, and reclining has also emerged.

SUMMARY

Therefore, the present disclosure provides a vehicle and a method of controlling the same for efficiently determining a seat jamming or a short-circuit of a seat control system during a folding or unfolding of a seat, and adjust the speeds of the seat folding, unfolding, and reclining. Additional aspects of the disclosure will be set forth in part in the description which follows and, in part, will be obvious from the description, or may be learned by practice of the disclosure.

Therefore, the present disclosure provides a vehicle that may include: a motor configured to rotate forward or backward to fold or unfold a seatback of a seat is toward a seat cushion; a current sensor configured to sense an output current of the motor; and a controller configured to determine a seat jamming or a short-circuit of an output of the motor based on a magnitude of the output current sensed for a predetermined period of time during forward or backward rotation of the motor.

The controller may be configured to determine that the seat jamming has occurred when the output current sensed for a predetermined first reference period of time is greater than or equal to a predetermined first reference current during forward or backward rotation of the motor. The controller may also be configured to determine a predetermined magnitude of load to be generated in a direction opposite to a direction in which the motor rotates forward or backward when the output current sensed for the predetermined first reference period of time is greater than or equal to the predetermined first reference current during forward or backward rotation of the motor, and determine that the seat jamming has occurred based on the generated load.

The current sensor may be configured to sense the output current for the first reference time when a predetermined period of time has elapsed from a start of the forward or backward rotation of the motor. The controller may be configured to determine that the output of the motor has been short-circuited when the output current sensed for a predetermined second reference period of time is greater than or equal to a predetermined second reference current during forward or backward rotation of the motor. The seat jamming may be a state in which an object is caught with the seat when the seatback is folded or unfolded, and the short-circuit of the output of the motor may be a state in which a circuit of the motor for outputting a current is short circuited.

The first reference period of time may be longer than the second reference period of time, and the first reference current may be less than the second reference current. The controller may be configured to: operate the motor to return the seatback to an original position before the motor operates in response to determining that the seat jamming has occurred during forward or backward rotation of the motor; and stop the motor in response to determining that the seat jamming has occurred during a return of the seatback to the original position.

Additionally, the controller may be configured to stop the motor in response to determining that the output of the motor has been short circuited. The vehicle further include an alert configured to alert a user to a situation that the seat jamming or the short-circuit of the output of the motor has occurred. In particular, the controller may be configured to, in response to determining that the seat jamming or the short-circuit of the output of the motor has occurred, emit an alert signal for alerting the user that the seat jamming or the short-circuit of the output of the motor has occurred. The vehicle may further include a switch configured to receive an input related to a folding command or an unfolding command of the seatback.

It is another aspect of the present disclosure to provide a vehicle that may include: a switch configured to receive an input related to a folding command, an unfolding command, or a reclining command of a seatback of a seatback; a motor configured to rotate forward or backward to fold the seatback toward a seat cushion unfold the seatback from the seat cushion, or rotate forward or backward to recline the seatback forward or backward by a predetermined angle with reference to a predetermined position; and a controller configured to determine a pulse width modulation (PWM) duty ratio of a driving current applied to the motor to adjust a rotating speed of the motor for folding or unfolding the seatback to be different from a rotating speed of the motor for reclining the seatback.

The controller may be configured to determine an application cycle of the driving current applied to the motor based on a frequency determined according to the PWM duty ratio. The controller may then be configured to adjust the rotating speed of the motor for folding or unfolding the seatback at a first speed, and adjust the rotating speed of the motor for reclining the seatback at a second speed based on the determined PWM duty ratio. Additionally, the controller may be configured to adjust the PWM duty ratio for the first speed of the motor to be greater than the second speed of the motor. The vehicle may further include a current sensor configured to sense a driving current applied to the motor.

It is another aspect of the present disclosure to provide a method of controlling a vehicle, the method may include: receiving an input related to a folding command or an unfolding command of a seatback of a seat; sensing an output current of a motor rotating forward or backward to fold the seatback toward a seat cushion or unfolded the seatback form the seat cushion; and determining a seat jamming or a short-circuit of an output of the motor based on a magnitude of the output current sensed for a predetermined time during forward or backward rotation of the motor.

The determining of the seat jamming may include determining that the seat jamming has occurred when the output current sensed for a predetermined first reference period of time is greater than or equal to a predetermined first reference current during forward or backward rotation of the motor. Additionally, the determining of the seat jamming may include: determining a predetermined magnitude of load to be generated in a direction opposite to a direction in which the motor rotates forward or backward when the output current sensed for the predetermined first reference period of time is greater than or equal to the predetermined first reference current during forward or backward rotation of the motor; and determining that the seat jamming has occurred based on the generated load.

The sensing of the output current of the motor may include sensing the output current for the first reference period of time when a predetermined period of time has elapsed from a start of the forward or backward rotation of the motor. The determining of the short-circuit of the output of the motor may include determining that the output of the motor has been short-circuited when the output current sensed for a predetermined second reference period of time is greater than or equal to a predetermined second reference current during forward or backward rotation of the motor. The first reference period of time may be greater than the second reference period of time, and the first reference current may be less than the second reference current.

The motor may be operated to return the seatback to an original position before the motor operates, in response to determining that the seat jamming has occurred during forward or backward rotation of the motor; and the motor may be stopped in response to determining that the seat jamming has occurred during a return of the seatback to the original position. The motor may be stopped in response to determining that the output of the motor has been short-circuited; and an alert signal for alerting the user that the seat jamming or the short-circuit of the output of the motor has occurred may be emitted in response to determining that the seat jamming or the short-circuit of the output of the motor has occurred.

It is another aspect of the present disclosure to provide a method of controlling a vehicle, the method may include: receiving an input related to a folding command, an unfolding command, or a reclining command of a seatback of a seat; determining a pulse width modulation (PWM) duty ratio of a driving current applied to a motor that rotates forward or backward to fold the seatback toward a seat cushion or unfold the seatback, or rotates forward or backward to recline the seatback forward or backward by a predetermined angle with reference to a predetermined position; and adjusting a rotating speed of the motor for folding or unfolding the seatback to be different from a rotating speed of the motor for reclining the seatback based on the determined PWM duty ratio.

The adjusting of the rotating speed of the motor may include determining an application cycle of the driving current applied to the motor based on a frequency determined according to the PWM duty ratio. The adjusting of the rotating speed of the motor may include adjusting the rotating speed of the motor for folding or unfolding the seatback at a first speed and adjusting the rotating speed of the motor for reclining the seatback at a second speed based on the determined PWM duty ratio. Additionally, the adjusting of the rotating speeds of the motor may include adjusting the PWM duty ratio for the first speed of the motor to be greater than the second speed of the motor. The method may further include sensing a driving current applied to the motor.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

Figure 1:
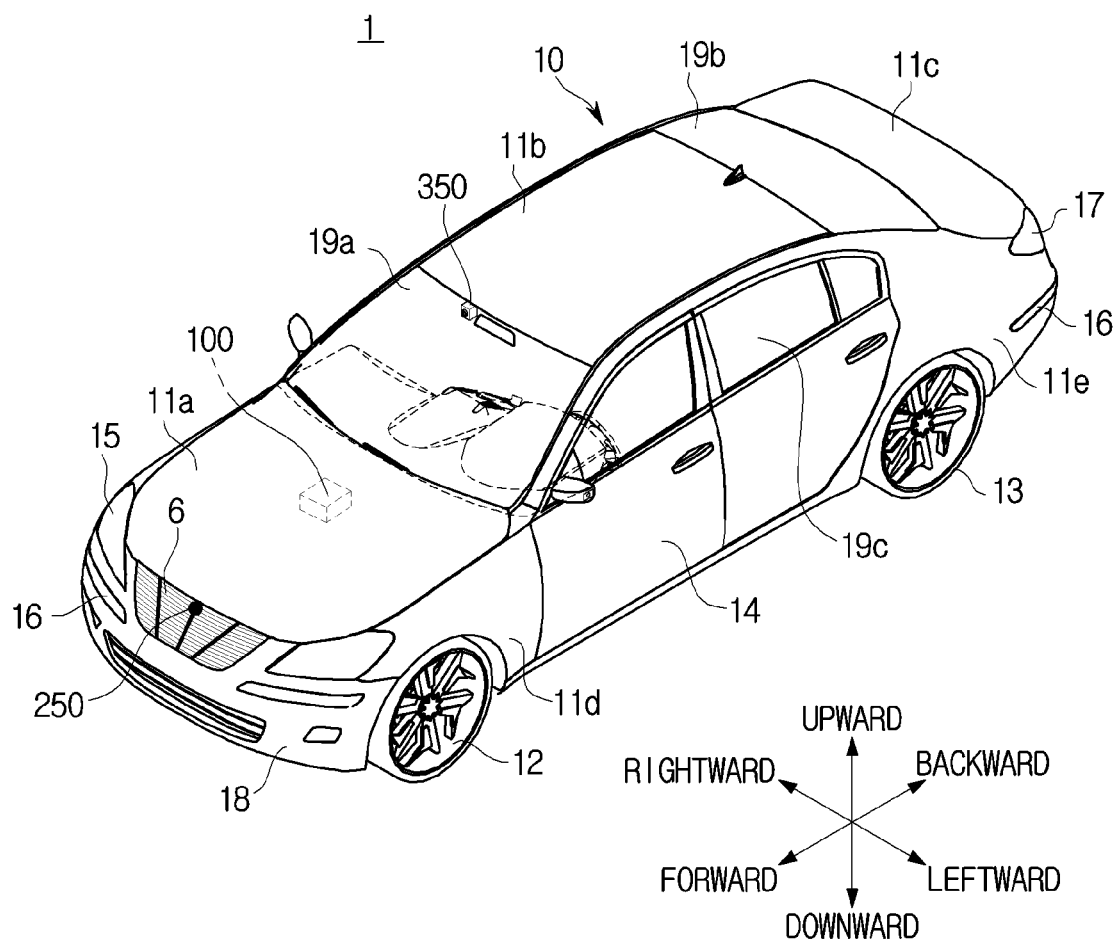
FIG. 1 is a perspective view schematically illustrating the external appearance of a vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

In the description, like numerals refer to like elements throughout the specification. Not all elements of embodiments of the present disclosure will be described, and description of what are commonly known in the art or what overlap each other in the embodiments will be omitted. The terms as used throughout the specification, such as "~ part", "~ module", "~ member", "~ block", etc., may be implemented in software and/or hardware, and a plurality of "~ parts", "~ modules", "~ members", or "~ blocks" may be implemented in a single element, or a single "~ part", "~ module", "~ member", or "~ block" may include a plurality of elements.

It will be further understood that the term "connect" or its derivatives refer both to direct and indirect connection, and the indirect connection includes a connection over a wireless communication network. It will be understood that, although the terms first, second, etc. may be used herein to describe various elements, these elements should not be limited by these terms. Reference numerals used for method steps are just used for convenience of explanation, but not to limit an order of the steps. Thus, unless the context clearly dictates otherwise, the written order may be practiced otherwise. Hereinafter, the principles and exemplary embodiments of the present disclosure will be described with reference to the accompanying drawings.

FIG. 1 is a perspective view schematically illustrating the external appearance of a vehicle 1 according to an exemplary embodiment. Referring to FIG. 1, it is assumed that a forward direction of the vehicle 1 is a travel direction of a vehicle 1, a leftward direction and a rightward direction are distinguished with respect to the forward direction, and when the forward direction is direction toward 12 o'clock position, a direction toward the 3 o'clock position or nearby thereof is defined as the rightward direction, and a direction toward the 9 o'clock position or nearby thereof is defined as the leftward direction. The opposite direction of the forward direction is a backward direction. Further, a direction toward the bottom of the vehicle with respect to a center of the vehicle 1 is referred to as a downward direction, and the opposite direction of the downward direction is referred to as an upward direction. A side disposed forward is referred to as a front side, a side disposed backward is referred to as a rear side, and a side disposed leftward or rightward is referred to as a lateral side. A side disposed leftward is defined as a left side, and a side disposed rightward is defined as a right side.

Referring to FIG. 1, the vehicle 1 may include a vehicle body 10 that forms the external appearance of the vehicle 1 and vehicle wheels 12 and 13. The vehicle body 10 includes a hood 11a that protects various devices required for driving the vehicle 1, such as an engine, a roof panel 11b that forms the interior indoor space, a trunk lid 11c provided with a storage space, a front fender 11d and a quarter panel 11e provided on the lateral side of the vehicle 1. In addition, a plurality of doors 15 hinged to the vehicle body 10 may be provided on the lateral side of the vehicle body 11.

A front window 19a is provided between the hood 11a and the roof panel 11b to provide a front view of the vehicle 1, and a rear window 19b is provided between the roof panel 11b and the trunk lid 11c to provide a rear view. Further, on an upper portion of the door 15, a side window 19c provides a driver with a side view. In addition, a headlamp 15 for illuminating the vehicle 1 in the traveling direction of the vehicle 1 may be provided on the front side of the vehicle 1.

In addition, a turn signal lamp 16 for indicating the traveling direction of the vehicle 1 may be provided on the front side and the rear side of the vehicle 1. The vehicle 1 may indicate the traveling direction thereof by flickering the turn signal lamp 16. Further, a tail lamp 17 may be provided at the rear of the vehicle 1 to indicate a gear shift state of the vehicle 1, a brake operation state, and the like of the vehicle 1. The vehicle 1 may include a sensor 250. The detecting sensor 250 may be configured to detect positional information of an obstacle, such as a pedestrian around the vehicle 1, and specifically, obtain coordinate information of an obstacle with respect to the vehicle 1.

The sensor 250 may be disposed on a radiator grill 6 of the vehicle 1, but the position and the number of the sensor are not limited. The sensor 250 may be implemented using one of various devices, for example, a radar using millimeter waves or microwaves, a light detection and ranging (LiDAR) using pulsed laser light, a vision sensor using visible light, an infrared sensor using infrared rays, an ultrasonic sensor using ultrasonic waves, or the like, or a combination thereof. When the sensor 250 is implemented using a radar, the sensor 250 may be configured to radiate millimeter waves or microwaves forward of the vehicle 1 and receive millimeter waves or microwaves reflected from an obstacle around the vehicle 1. After receiving the millimeter waves or the microwaves, the sensor 250 may be configured to detect physical properties, such as the distance, speed, and shape of the obstacle in front of the vehicle 1, from the reception time of the waves, the strength of the waves, or the change in frequency of the waves.

At least one vehicle controller 100 may be provided within the vehicle 1. The vehicle controller 100 may be configured to perform an electronic control related to the operation of the vehicle 1. The vehicle controller 100 may be installed at an arbitrary position inside the vehicle 1 according to the designer's selection. For example, the vehicle controller 100 may be installed between an engine room and a dashboard, or may be provided inside a center fascia. Additionally, the vehicle controller 100 may include at least one processor configured to receive an electrical signal, process the input electrical signal, and output the processed electrical signal. The at least one processor may be implemented as at least one semiconductor chip and associated components. The at least one semiconductor chip and associated components may be mounted on a printed circuit board that may be installed inside the vehicle 1. At least one imager 350 may be provided inside the vehicle 1. The imager 350 or imaging device (e.g., camera, video camera, or the like) may be configured to photograph or capture an image of a surrounding of the vehicle 1 while the vehicle 1 is being driven or stopped, may be configured to detect a pedestrian around the vehicle 1, and acquire position information of the pedestrian.

Figure 2:
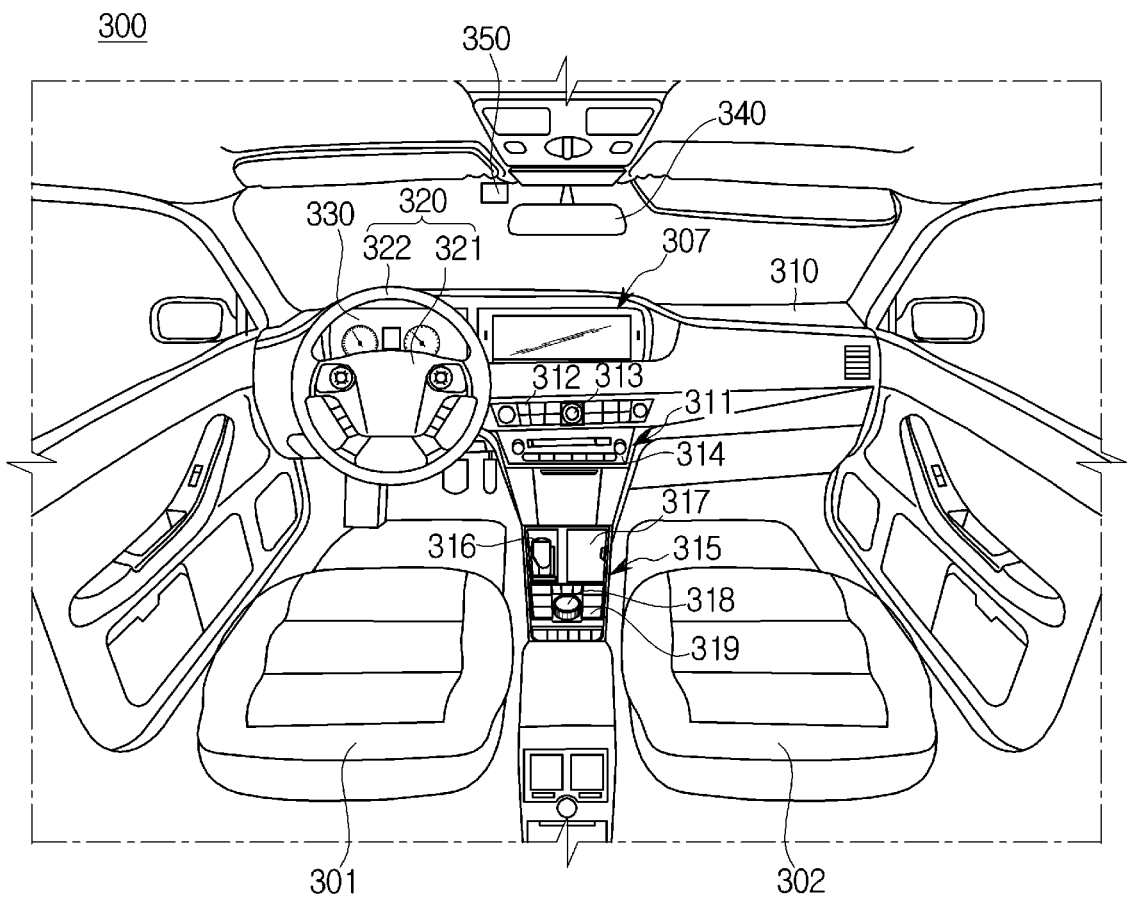
FIG. 2 is a view illustrating the interior structure of a vehicle according to an exemplary embodiment of the present disclosure.

FIG. 2 is a view illustrating the interior structure of a vehicle according to an exemplary embodiment. Referring to FIG. 2, a driver seat 301, an assistant seat 302, a dashboard 310, a steering wheel 320, and an instrument panel 330 are provided in an interior 300 of the vehicle 1. The dashboard 310 refers to a panel which partitions the interior 300 of the vehicle 1 from an engine compartment and in which various components necessary for operation are installed. The dashboard 310 may be disposed in front of the driver seat 301 and the assistant seat 302. The dashboard 310 may include an upper panel, a center fascia 311, a gear box 315, and the like.

A vehicle display device 307 may be installed on the upper panel of the dashboard 310. The vehicle display device 307 may be configured to provide a driver or a passenger of the vehicle 1 with various information in the form of an image. For example, the vehicle display device 307 may be configured to display a map, weather, news, music, and various moving images and still images, various information related to the state and operation of the vehicle 1, for example, audible information related to an air-conditioner. In addition, the vehicle display device 307 may be configured to provide the driver or passenger with an alert based on the degree or risk of danger.

Various types of devices, such as a processor, a communication module, a satellite navigation device receiving module, a storage device, and the like, may be installed inside the dashboard 310. The processor installed in the vehicle may be configured to operate various electronic devices installed within the vehicle 1 and execute the functions of the vehicle controller 100 as described above. The devices described above may be implemented using various components, such as semiconductor chips, switches, integrated circuits, resistors, volatile or non-volatile memories or printed circuit boards, and the like.

The center fascia 311 may be installed at the center of the dashboard 310, and may include input devices 312 to 314 for inputting various commands related to the vehicle (e.g., configured to receive vehicle command signals). The input devices 312 to 314 may be implemented using a physical button, a knob, a touch pad, a touch screen, a stick type manipulation device, a track ball, or the like. The driver may control various operations of the vehicle 1 by manipulating the input devices 311 to 314, 318, and 319.

Further, the gear box 315 may be at a lower end of the center fascia 311 between the driver seat 301 and the assistant seat 302. The gear box 315 may include a gear 316, a housing box 317, and various input devices 318 and 319. The input devices 318 and 319 may be implemented using a physical button, a knob, a touch pad, a touch screen, a stick type manipulation device, a track ball, or the like. The housing box 317 and the input devices 318 and 319 may be omitted according to exemplary embodiments. At a side, adjacent to the driver seat, of the dashboard 310, the steering wheel 320 and the instrument panel 330 may be provided.

The steering wheel 320 may be rotatable in a predetermined direction according to the manipulation of the driver, and a front wheel or a rear wheel of the vehicle 1 may be rotated according to the rotating direction of the steering wheel 320 to thus steer the vehicle 1. The steering wheel 320 may include a spoke 321 connected to a rotating shaft and a knob wheel 322 coupled to the spoke 321. The spoke 321 may include input devices configured to receive various commands, and the input devices may be implemented using a physical button, a knob, a touch pad, a touch screen, a stick type manipulation device, or a trackball. The knob wheel 322 may have a circular shape for of the convenience of the driver, but the shape of the knob wheel 322 is not limited thereto.

At least one of the spoke 321 and the knob wheel 322 may include at an inside thereof with a vibrating unit (201 in FIG. 4) to vibrate the at least one of the spoke 321 and the knob wheel 322 at a predetermined strength according to an external control. According to exemplary embodiments, the vibrating unit may be vibrated at various strengths based on an external control signal, and thus the at least one of the spoke 321 and the knob wheel 322 may be vibrated at various strengths according to the external control signal. The vehicle 1 may provide the driver with a haptic alert using the vibration. For example, at least one of the spoke 321 and the knob wheel 322 may be vibrated at a strength that corresponds to the degree of danger that is determined when the vehicle 1 changes a driving lane.

The instrument panel 330 may provide the driver with various information related to the vehicle 1, such as the speed of the vehicle 1, the number of revolutions of the engine, the remaining amount of the fuel, the temperature of the engine oil, the flickering of the turn signal lamp, the distance travelled by the vehicle, and the like. The instrument panel 330 may be implemented using an illumination lamp, a scale panel, or the like, and may be implemented using a display panel according to an exemplary embodiment. When the instrument panel 330 is implemented using a display panel, the instrument panel 330 may be configured to display or output various information, such as a fuel efficiency, and information indicating whether various features mounted on the vehicle 1 are executed, and the like, in addition to the above described information.

According to one exemplary embodiment, the instrument panel 330 may be configured to output a different alert to the driver based on the degree or risk of danger to the vehicle 1. In particular, the instrument panel 330 may provide a different alert to the driver based on the degree of danger determined when the vehicle 1 changes a driving lane. A room mirror 340 (e.g., rear view mirror) may be disposed at the top of the interior of the vehicle 1, and the driver may view the interior of the vehicle 1 or the rear of the vehicle 1 through the room mirror 340.

As described above, at least one imager 350 may be disposed inside the vehicle 1. Although the imager 350 is illustrated as being provided around the room mirror 340 in FIG. 2, the position of the imager 350 is not limited thereto and may be disposed at any located where it may acquire image information by imaging the inside or the outside of the vehicle 1. The imager 350 may be configured to acquire a surrounding image of the vehicle 1 while the vehicle 1 is being driven or is stopped, and may be configured to detect a pedestrian around the vehicle 1 and acquire the position information of the pedestrian.

Figure 3:
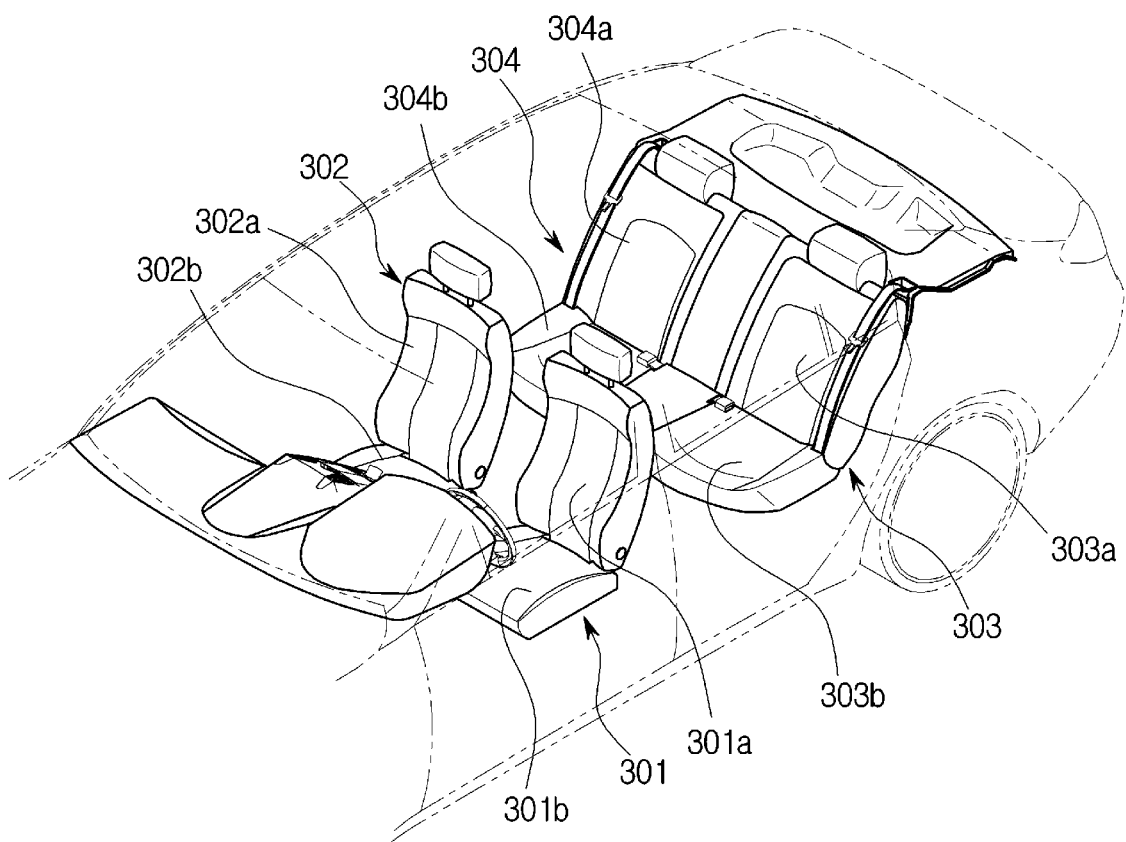
FIG. 3 is a perspective view illustrating a plurality of seats to which an automatic seat folding apparatus is applied according to one exemplary embodiment of the present disclosure.
Figure 4A:
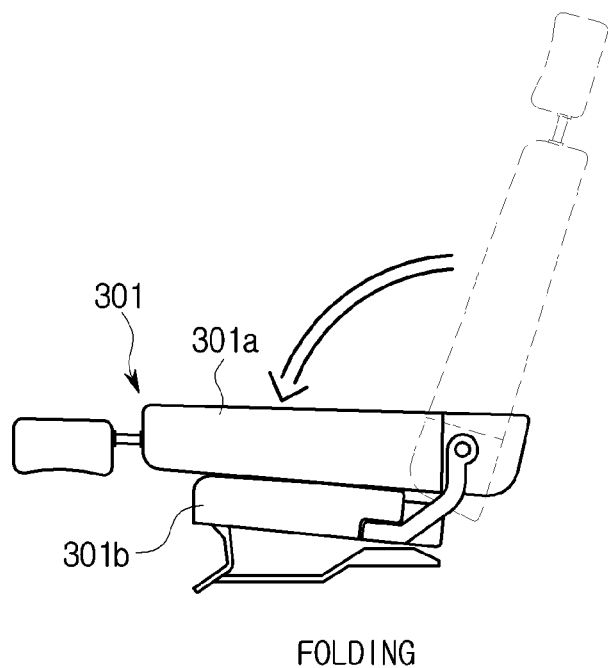
FIGS. 4A-4B are views illustrating a seat being folded or unfolded according to one exemplary embodiment of the present disclosure.
Figure 4B:
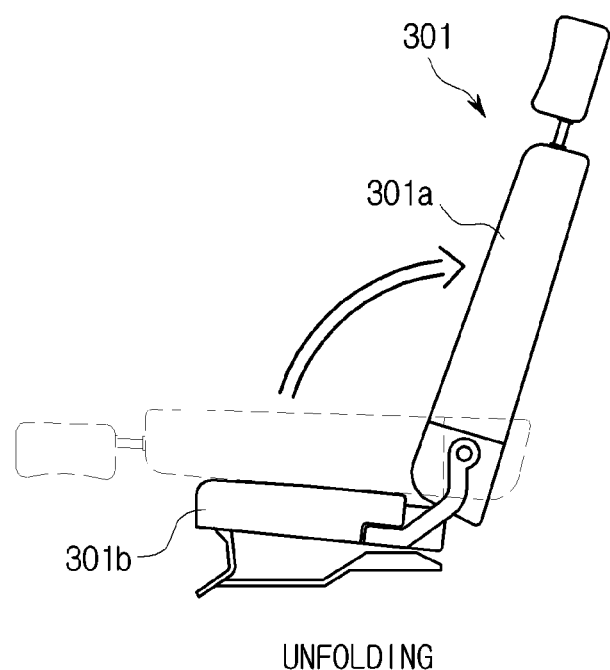
Figure 5:
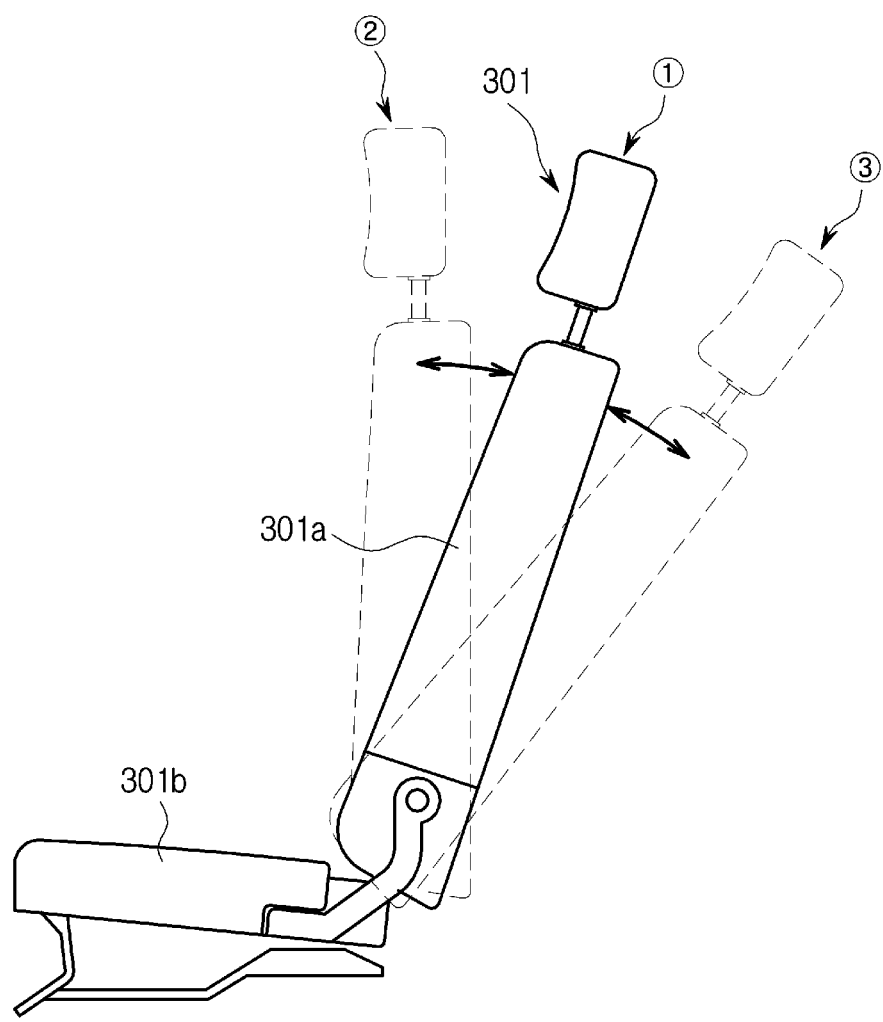
FIG. 5 is a view illustrating a seat reclining according to one exemplary embodiment of the present disclosure.

FIG. 3 is a perspective view illustrating a plurality of seats to which an automatic seat folding apparatus is applied according to one exemplary embodiment, FIGS. 4A-4B are views illustrating a seat being folded or unfolded according to one exemplary embodiment, and FIG. 5 is a view illustrating a seat reclining according to one exemplary embodiment. Referring to FIG. 3, the seats 301 to 304 provided within the vehicle 1 include seat cushions 301b to 304b on which occupants may be seated and seatbacks 301a and 304a provided at the rear sides of the seat cushions 301b to 304b and on which the occupants may have their backs leaned.

Generally, the seats provided within the vehicle 1 may be provided in one row or two rows, and depending on the type of the vehicle 1, the seats provided in the vehicle 1 may be provided in three or more rows. Each of the seats may be adjusted individually, or may be adjusted integrally. For the sake of convenience in description, the following description will be made in relation to the driver seat 301 among the plurality of seats as an example.

Referring to FIG. 4A, the seatback 301a of the seat 301 may be folded toward the seat cushion 301b by an automatic seat folding apparatus. On the other hand, referring to FIG. 4B, the seatback 301a folded on the seat cushion 301b may be unfolded to the original position. Accordingly, the automatic seat folding apparatus may include a rotating gear installed at one end of the seat cushion 301b to provide the seatback 301 with a rotary force and configured to receive a driving force to rotate the seatback 301a of the seat 301 with respect to a predetermined position, a driving gear engaged with the rotating gear, and a motor rotating the driving gear. The driving gear may be rotated by the motor. As the driving gear rotates, the rotating gear engaged with the driving gear may be rotated. By way of the rotating gear being rotated, the seatback 301a may be folded toward the seat cushion 301b or unfolded to achieve folding or unfolding of the seatback.

Referring to FIG. 5, the seatback 301a of the seat 301 may be reclined forward or backward by a predetermined angle with respect to a predetermined position ①. In other words, before the seatback 301a of the seat 301 is folded or unfolded, the seatback 301a may be reclined forward or backward to position ② or position ③ with respect to the position ① by being moved forward or backward by a particular angle with respect to the position ①, which is a predetermined position on the seat design. The inclination of the seatback 301a may be adjusted such that the occupant is seated in a desired posture by allowing the seatback 301a to be moved a predetermined angle without being folded on the seat cushion 301b. Data regarding the angle at which the seat 301 is reclined with respect to the predetermined position ① may be preset and stored in a storage.

Figure 6:
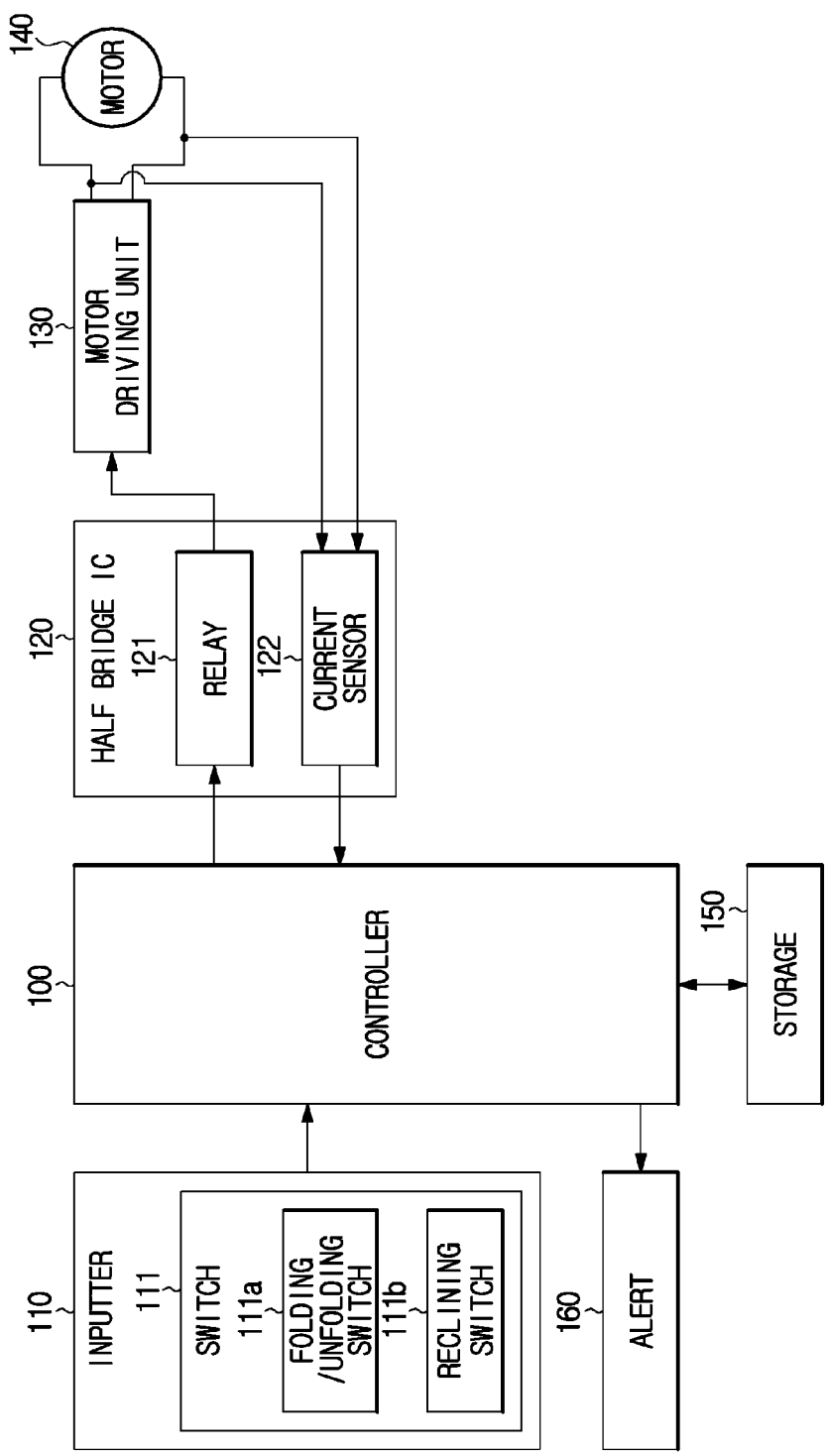
FIG. 6 is a control block diagram of a vehicle according to an exemplary embodiment of the present disclosure.
Figure 7:
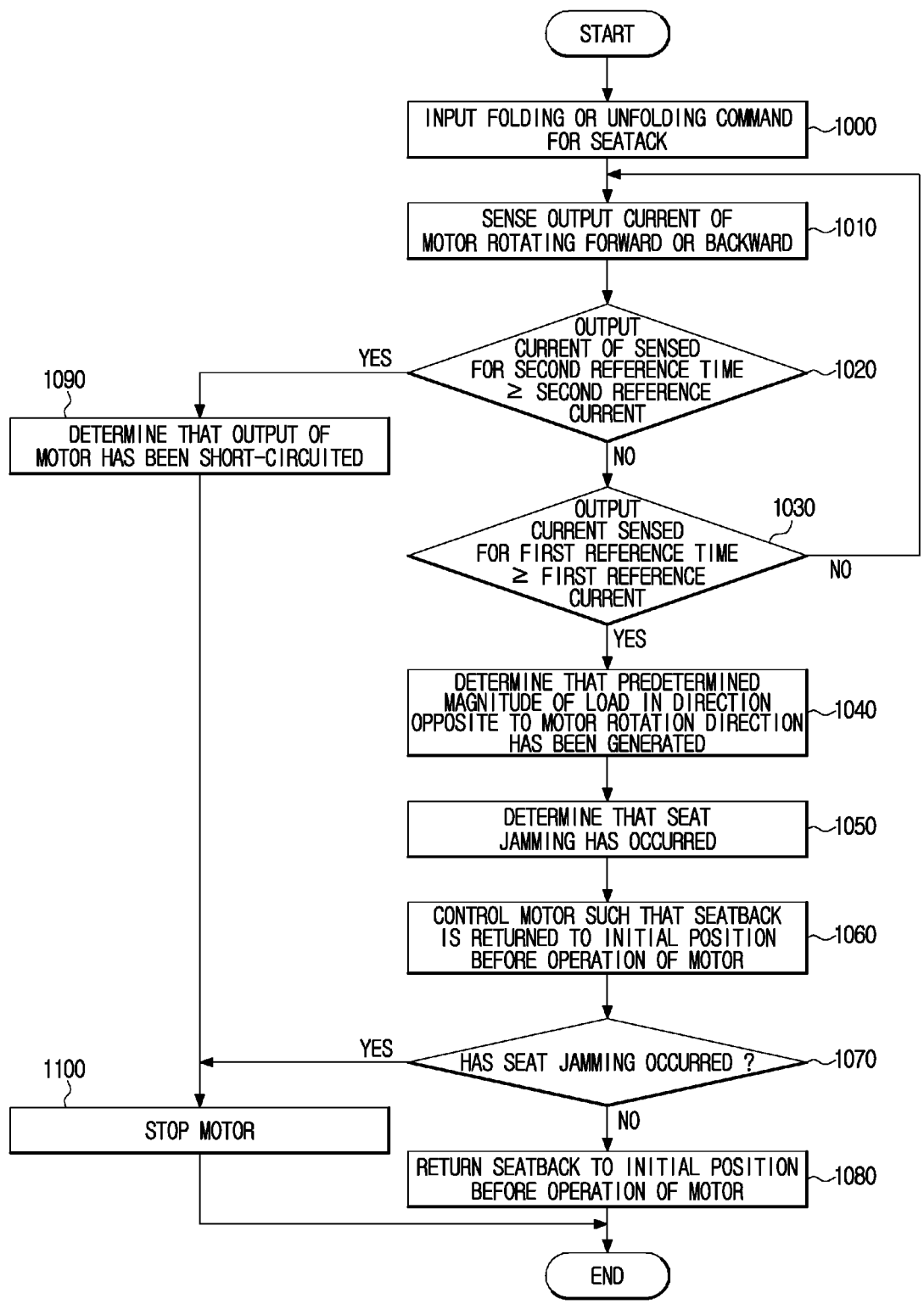
FIGS. 7 and 8 are flowcharts showing a method of controlling a vehicle according to an exemplary embodiment of the present disclosure.
Figure 8:
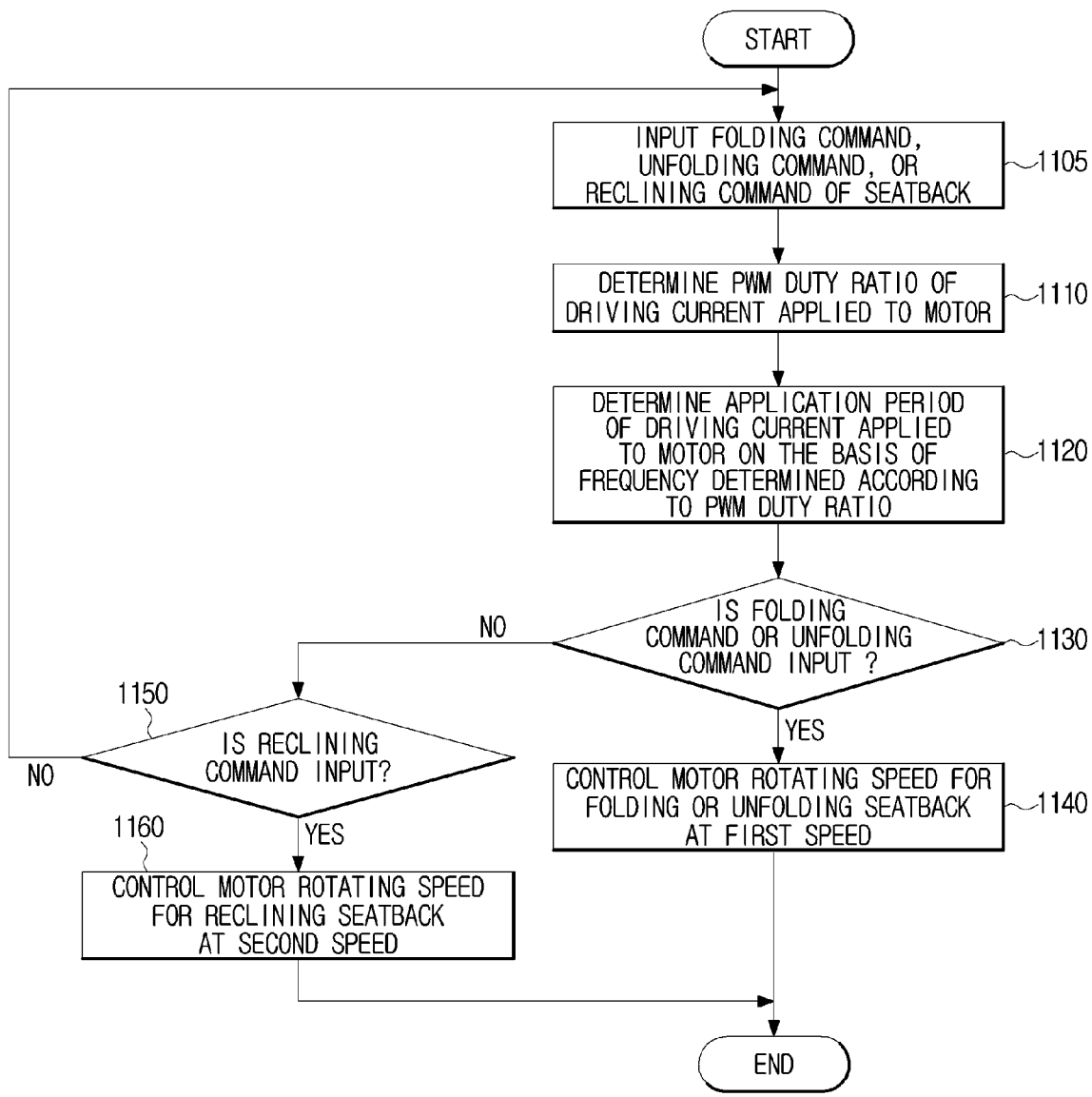

FIG. 6 is a control block diagram of a vehicle according to an exemplary embodiment, and FIGS. 7 and 8 are flowcharts showing a method of operating a vehicle according to an exemplary embodiment. Referring to FIG. 6, the vehicle 1 according to the exemplary embodiment may include a controller 100 configured to execute the overall operation of the vehicle 1 and the seat 301, an inputter 110 configured to receive a control command for each part of the vehicle 1, a half bridge IC 120 connected to a motor driving unit 130 to transmit a motor control signal and sense a current, the motor driving unit 130 configured to rotate a motor 140 forward or backward according to the control of the controller 100, the motor 140 rotating forward or backward according to a driving signal of the motor driving unit 130 to fold, unfold, or recline the seat 301, and a storage 150 configured to store data related to the operation of the vehicle 1.

The inputter 110 may include a folding/unfolding switch 111a configured to receive a command for automatically folding or unfolding the seatback 301a of the seat 301, and a reclining switch 111b configured to receive a reclining command for the seatback 301a. The folding/unfolding switch 111a may be implemented as a folding switch and an unfolding switch separately provided from each other, or as a single switch for receiving both the folding command and the unfolding command.

The user may input a folding or unfolding command for the seatback 301a by turning on or otherwise engaging the folding/unfolding switch 111a (1000), and input a reclining command for the seatback 301a by turning on the reclining switch 111b. When a folding/unfolding command or a reclining command of the seatback 301a is input through the switch 111, an operation signal for the input folding/unfolding command or reclining command may be transmitted to the controller 100. When the folding/unfolding command of the seatback 301a is input through the folding/unfolding switch 111a or the reclining command of the seatback 301a is input through the reclining switch 111b, the controller 100 may be configured to transmit a control signal for operating the motor 140 through a relay 121 included in the half bridge IC 120.

The half bridge IC 120 may include the relay 121 configured to transmit a signal for adjusting the driving of the motor 140 and a current sensor 122 configured to sense a current applied to the motor 140 or a current being output from the motor 140. Such a half bridge IC 120 may be individually implemented in a control circuit of each of a plurality of seats provided in the vehicle 1, or may be implemented as a half bridge IC that transmits an integrated control signal for controlling all of the plurality of seats.

The motor driving unit 130 may be configured to rotate the motor 140 forward or backward to fold, unfold, or recline the seatback 301a based on the received control signal. In addition, a motor rotation detector (not shown) may be configured to detect whether the motor rotates, and output a motor rotation detection signal to the controller 100.

The motor rotation detector may be configured to detect rotation of the motor 140, and may be implemented using a current or a hall sensor.

The motor 140 may be rotated forward or backward according to the control of the motor driving unit 130, and the seatback 301a may be folded in a direction toward the seat cushion 301b or may be unfolded in the opposite direction of the folding direction as shown in FIGS. 4A-4B. In other words, for the seatback 301a to be folded or unfolded, a current may be applied to the motor driving unit 130, and when the motor 140 is rotated forward or backward, a current may be output from the motor 140. At this time, the current sensor 122 may be configured to sense the current applied to the motor driving unit 130 as well as the output current of the motor 140.

When an object or the like is caught between the seatback 301a and the seat cushion 301b while the seatback 301a is folded in the direction toward the seat cushion 301b or unfolded in the opposite direction, an occurrence of a seat jamming should be determined to prevent the user from being injured, or a system of adjusting the seat 301 from being broken. When a short-circuit occurs in the system of adjusting the seat 301 while folding, unfolding or reclining the seatback 301a, an overcurrent may be generated and thus the control system may be broken. Accordingly, there is also a need to determine an occurrence of a short-circuit. To sense such a seat jamming or a short-circuit according to the conventional technology, an additional sensor is needed. However, the method of controlling the vehicle according to the disclosed exemplary embodiment may be configured to determine a seat jamming or a short-circuit of the output of the motor by sensing an output current of the motor 140 rotating forward or backward.

Figure 9A:
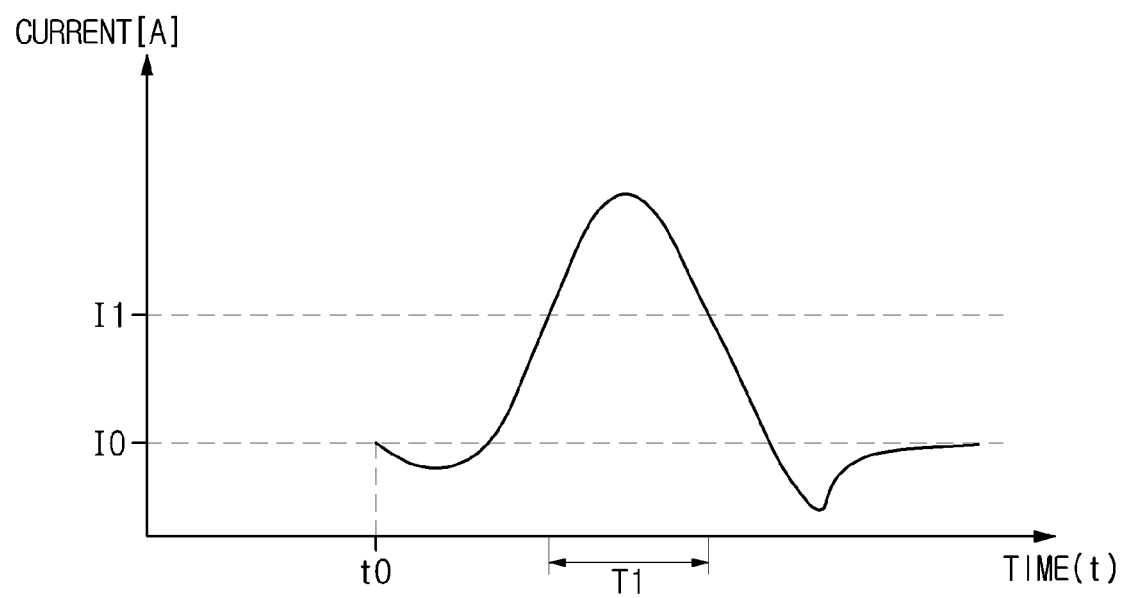
FIGS. 9A-9B are views showing the output current of a motor during a seat jamming or a short-circuit according to an exemplary embodiment of the present disclosure.
Figure 9B:
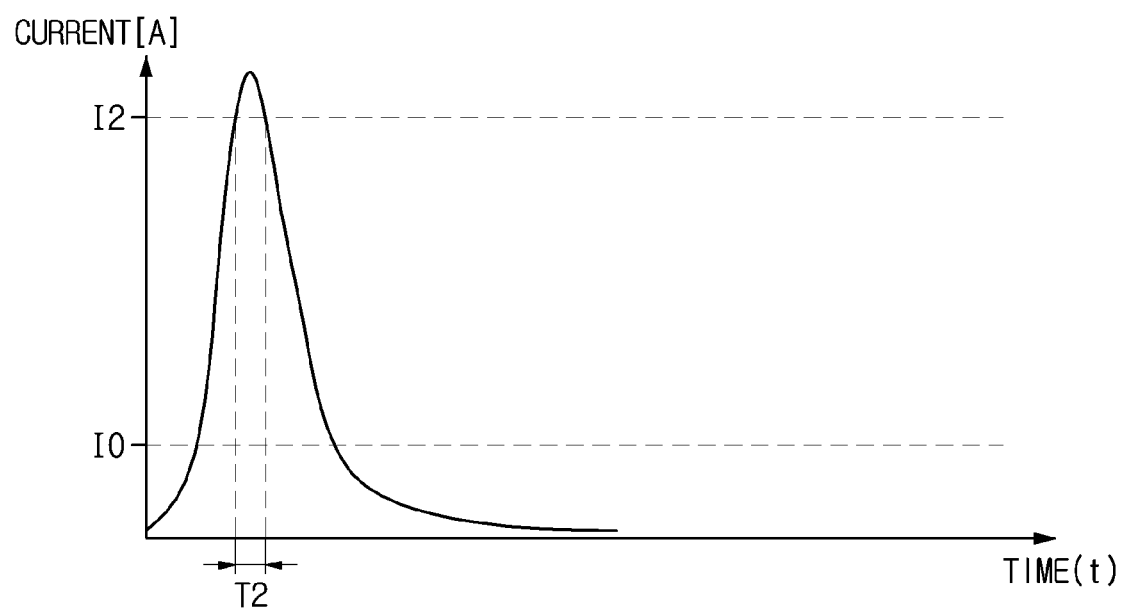

FIGS. 9A and 9B are graphs showing the output current of a motor at a time of seat jamming or short-circuit according to an exemplary embodiment. The current sensor 122 may sense the output current of the motor 140 when the motor 140 rotates forward or backward such that the seatback 301a is folded or unfolded (1010).

The controller 100 may be configured to determine an occurrence of a seat jamming or short-circuit of the output of the motor 140 based on the magnitude of the output current of the motor 140 sensed by the current sensor 122. In particular, the controller 100 may be configured to determine an occurrence of a seat jamming or short-circuit based on the magnitude of the output current of the motor 140 sensed for a predetermined period of time during a forward or backward rotation of the motor 140. First, the controller 100 may be configured to determine whether the output current of the motor 140 sensed for a predetermined second reference period of time T2 is greater than a second reference current I2 to determine whether the output of the motor 140 is short-circuited (1020).

Referring to FIG. 9B, when the output of the motor 140 is short-circuited, an overcurrent is generated in the system for a short period of time. Accordingly, the controller 100 may be configured to whether the magnitude of the output current sensed for the second reference period of time T2 after driving of the motor 140 is equal to or greater than the second reference current I2 that is a criterion for determining whether a short-circuit occurs. The controller 100 may then be configured to determine that the output of the motor 140 has been short-circuited when the magnitude of the output current of the motor 140 sensed for the second reference period of time T2 is equal to or greater than the second reference current I2 (1090).

The controller 100 may be configured to stop the rotation of the motor 140 by operating the motor driving unit 130 when the output of the motor 140 is determined to be short-circuited (1100). The controller 100 may be configured to determine that the output of the motor 140 is not short-circuited when the magnitude of the output current of the motor 140 sensed for the second reference period of time T2 is less than the second reference current I2, and may be configured to determine a seat jamming based on the output current of the motor 140 when a predetermined time has elapsed. In other words, referring to FIG. 9A, the controller 100 may be configured to determine the occurrence of a seat jamming based on the output current of the motor 140 sensed from the time t0, which is a time point after a predetermined period of time has elapsed since the motor 140 starts to rotate forward or backward.

When the folding or unfolding signal is input and the motor 140 starts to rotate forward or backward, an initial starting current of the motor 140 is generated. In particular, to prevent the seat jamming from being determined based on the starting current, the controller 100 may be configured to determine the occurrence of a seat jamming based on the magnitude of the output current sensed after a predetermined period of time has elapsed. The controller 100 may then be configured to determine whether the magnitude of the output current of the motor 140 sensed for a predetermined first reference period of time T1 is equal to or greater than a first reference current I1 to determine the occurrence of a seat jamming (1030).

Referring to FIG. 9A, a normal operation current I0 may be output when the motor 140 normally rotates forward or backward after being driven. However, when an object is caught in the seatback 301a during a folding or unfolding of the seatback 301a, a current greater than the normal operation current I0 may be output. In other words, when an object is caught during a folding or unfolding of the seatback 301a, a predetermined magnitude of a load (e.g., a value of about 5 kgfm or greater) may be generated in a direction opposite to the direction in which the motor 140 rotates forward or backward, and thus the output current of the motor 140 has a value greater than the normal operation current I0. When the magnitude of the output current sensed for the predetermined first reference period of time T1 is equal to or greater than the predetermined first reference current I1 for determining the seat jamming, the controller 100 may be configured to determine that a predetermined magnitude of a load in a direction opposite to the rotation direction of the motor 140 has been generated (1040), and determine 1050 that a seat jamming has occurred based on the generated load (1050).

As described above, when a short-circuit occurs during the operation of the motor 140, an overcurrent is generated for a short period of time, and when a seat jamming occurs, a current having a value greater than the normal operation current I0 is generated for a predetermined period of time. In other words, the first reference period of time T1, which is a criterion for determining a seat jamming, is greater than the second reference period of time T2, which is a criterion for determining a short-circuit, and the magnitude of the first reference current I1 is greater than the second reference current I2.

The controller 100 may be configured to operate the motor 140 to return the seatback 301a to the initial position before the motor 140 operates in response to determining that a seat jamming has occurred during the forward or backward rotation of the motor 140 (1060), and may be configured to determine whether the seat jamming occurs even during a return of the seatback 301a to the initial position (1070). The determining of a seat jamming performed during the return of the seatback 301a to the initial position may be performed in the same manner as described above, based on the magnitude of the output current sensed for a predetermined period of time during the operation of the motor 140, and the same description will be omitted.

The seatback 301a may be returned to the initial position before the operation of the motor 140 when a seat jamming does not occur during the return of the seatback 301a to the initial position according to the operation of the motor 140 by the controller 100 (1080), and an injury of a human or a system malfunction caused by an object caught in the seat may be prevented. The controller 100 may be configured to stop the rotation of the motor 140 by operating the motor driving unit 130 in response to determining that the seat jamming has occurred during the return of the seatback 301a to the initial position (1100).

Accordingly, the controller 100 may be configured to determine the occurrence of a seat jamming and the occurrence of a short-circuit of the output of the motor 140 by respectively comparing the magnitudes of the output currents of the motor 140 sensed by the current sensor 122 for different predetermined time periods with different predetermined reference current values, respectively. The controller 100 may be configured to provide a notification to the user of a seat jamming or short-circuit through an alert 160. The alert 160 may be a buzzer or a speaker configured to output an alert sound, an audio processor having a speaker configured to output an alert speech, or a liquid crystal display (LCD). The alert 160 may output or display one of an alert sound, an alert speech, and an alert screen under the control of the controller 100 in response to an seat jamming or short-circuit, thereby notifying the user of the seat jamming or short-circuit. The controller 100 may be configured to determine a seat in which a seat jamming has occurred among a plurality of seats, and display the seat in which the seat jamming has occurred through an alert screen, and the corresponding seat may be flickered to allow a driver or an occupant seated on the corresponding seat to more easily recognize the seat in which the seat jamming has occurred.

Figure 10:
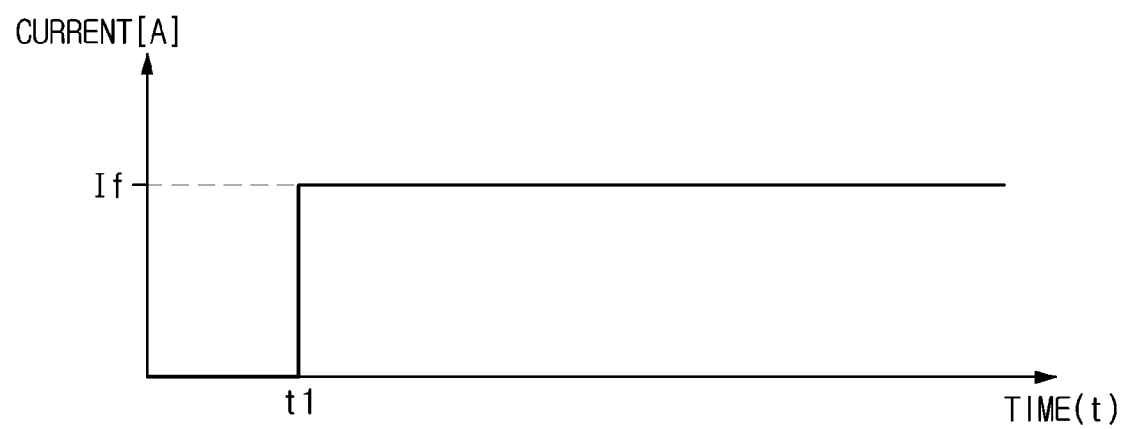
FIG. 10 is a view showing the control of a rotating speed of the motor during a seat folding or an unfolding according to one exemplary embodiment of the present disclosure.
Figure 11:
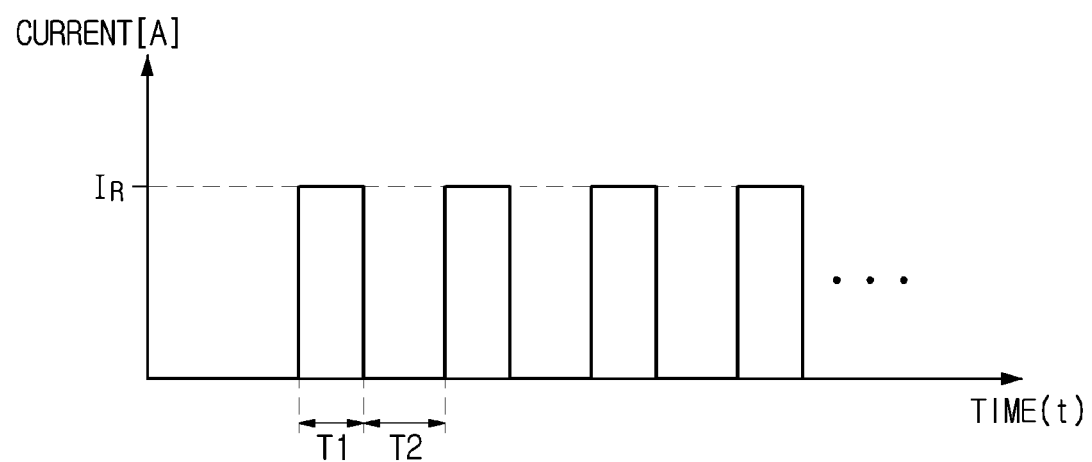
FIGS. 11 to 12 are conceptual diagrams showing the control of the rotating speed of the motor during a seat reclining according to an exemplary embodiment of the present disclosure.
Figure 12:
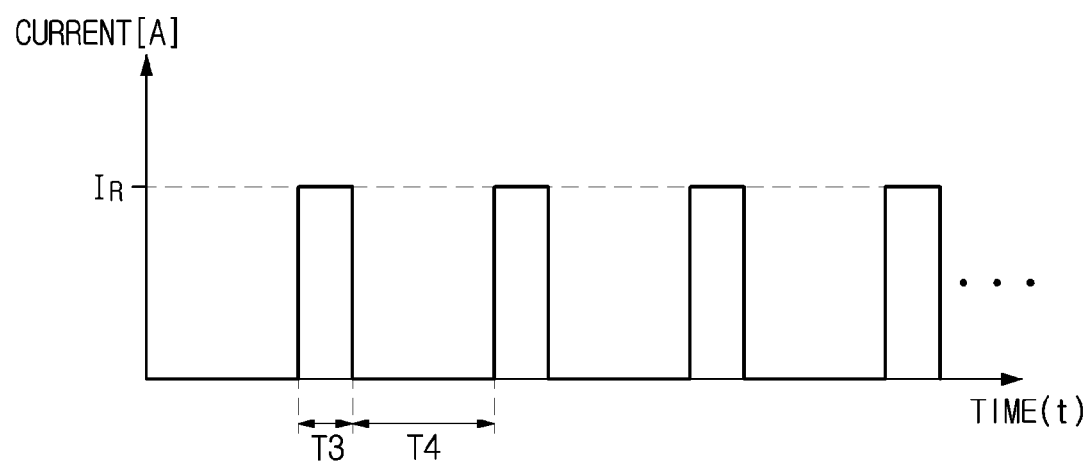

FIG. 10 is a diagram showing the control of the rotating speed of the motor during a seat folding or an unfolding according to one exemplary embodiment. FIGS. 11 to 12 are conceptual diagrams showing the control of the rotating speed of the motor during a seat reclining according to an exemplary embodiment. Referring again to FIG. 6, the half bridge IC 120 may include the relay 121 configured to transmit a signal for adjusting the driving of the motor 140 and the current sensor 122 configured to sense the current applied to the motor 140 and the current output from the motor 140.

The half bridge IC 120 may be configured to adjust a power width modulation (PWM) duty ratio of the driving current applied to the motor 140 to adjust the rotating speeds of the motor 140 to differ depending on the operation mode of the motor 140. The switch 111 may be configured to receive a folding command, an unfolding command, or a reclining command of the seatback 301a (1105). In particular, the folding/unfolding switch 111a may be configured to receive the folding command or the unfolding command of the seatback 301a, and the reclining switch 111b may be configured to receive the reclining command of the seatback 301a.

The controller 100 may then be configured to determine the PWM duty ratio of the driving current applied to the motor 140 based on the input folding command, unfolding command, or reclining command (1110), and determine an application period of the driving current applied to the motor 140 based on the frequency that is determined according to the PWM duty ratio (1120). In other words, when the input command is a folding command or an unfolding command, the controller 100 may be configured to apply the driving current for rotating the motor 140 forward or backward to fold or unfold the seatback 301a at a point in time t1 at which the driving of the motor 140 is started without performing the PWM control as shown in FIG. 10.

The controller 100 may further be configured to execute the folding or unfolding of the seatback 301a at a high speed by applying the driving current If of the motor 140 without adjusting the PWM. On the other hand, when the input command is a reclining command, the controller 100 may be configured to determine the duty ratio as shown in FIGS. 11 and 12, and determine on/off periods of a reclining drive current IR applied to the motor 140 according to the PWM duty ratio to adjust the reclining speed of the seatback 301a at a low speed.

Referring to FIG. 11, the controller 100 may be configured to determine the PWM duty ratio to turn on the reclining drive current IR applied to the motor 140 during a time T1 and turned off during a time T2. For example, referring to FIG. 11, when T1 is 16 µsecs and T2 is 24 µsecs, the application period of the reclining drive current IR applied to the motor 140 is 40 µsecs, and the frequency is determined to 1/40 µsec, that is, 20 kHz.

Referring to FIG. 12, the controller 100 may be configured to change the PWM duty ratio, and adjust the reclining drive current IR to be turned on during a time T3 shorter than the time T1 and to be turned off during a time T4 longer than the time T2. In other words, the controller 100 may be configured to adjust the reclining application period and frequency by adjusting the PWM duty ratio to a value different from that shown in in FIG. 11. Accordingly, the controller 100 may be configured to adjust the reclining speed of the seatback 301a at a low speed by applying the reclining drive current IR to the motor 140 according to the PWM control.

Referring again to FIG. 8, the controller 100 may be configured to determine whether the command received through the switch 111 is a folding command or an unfolding command (1130), and when the received command is a folding command or an unfolding command, the controller 100 may be configured to adjust the rotating speed of the motor 140 for executing the folding or unfolding of the seatback 301a at a first speed as described with reference to FIG. 10 (1140). When the received command is not a folding command or an unfolding command, the controller 100 may be configured to determine whether the received command is a reclining command (1150). When the input command is a reclining command, the controller 100 may be configured to adjust the rotating speed of the motor 140 for reclining the seatback 301a at a second speed as described with reference to FIGS. 11 and 12 (1160).

Accordingly, the controller 100 may be configured to determine the PWM duty ratio of the driving current applied to the motor 140 and adjust the rotating speed of the motor 140 for folding or unfolding the seatback 301a to be different from the rotating speed of the motor 140 for reclining the seatback 301a, thereby dualizing the speed control according to the operation mode of the seatback 301a. In other words, the controller 100 may be configured to adjust the PWM duty ratio for the first speed of the motor 140 to be greater than the second speed of the motor 140.

Meanwhile, the disclosed exemplary embodiments may be embodied in the form of a recording medium storing instructions executable by a computer. The instructions may be stored in the form of program code and, when executed by a processor, may generate a program module to perform the operations of the disclosed exemplary embodiments. The recording medium may be embodied as a non-transitory computer-readable recording medium. The non-transitory computer-readable recording medium includes all kinds of recording media in which instructions which can be decoded by a computer are stored, for example, a Read Only Memory (ROM), a Random Access Memory (RAM), a magnetic tape, a magnetic disk, a flash memory, an optical data storage device, and the like.

As is apparent from the above, the vehicle and a method of controlling the same may efficiently determine a seat jamming or a short-circuit of the seat control system during a folding or unfolding of the seatback of the seat, and individually adjust the speeds of the folding, unfolding, and reclining of the seat.

Although exemplary embodiments of the present disclosure have been described for illustrative purposes, those skilled in the art will appreciate that various modifications, additions and substitutions are possible, without departing from the scope and spirit of the disclosure. Therefore, exemplary embodiments of the present disclosure have not been described for limiting purposes.

What is claimed is:

1. A vehicle, comprising:
   a motor configured to rotate forward or backward to fold a seatback of a seat folded toward a seat cushion or unfold the seatback of the seat from the seat cushion;
   a current sensor configured to sense an output current of the motor; and
   a controller configured to determine a seat jamming or a short-circuit of an output of the motor based on a magnitude of the output current sensed for a predetermined time during forward or backward rotation of the motor,
   wherein the controller is configured to stop the motor in response to determining that the output of the motor has been short circuited,
   wherein the controller is configured to, in response to determining that the seat jamming or the short-circuit of the output of the motor has occurred, emit an alert signal through an alert screen or by flickering the seat.

2. The vehicle of claim 1, wherein the controller is configured to determine that the seat jamming has occurred when the output current sensed for a predetermined first reference period of time is greater than or equal to a predetermined first reference current during forward or backward rotation of the motor.

3. The vehicle of claim 2, wherein the controller is configured to determine a predetermined magnitude of load to be generated in a direction opposite to a direction in which the motor rotates forward or backward when the output current sensed for the predetermined first reference period of time is greater than or equal to the predetermined first reference current during forward or backward rotation of the motor, and determine that the seat jamming has occurred based on the generated load.

4. The vehicle of claim 2, wherein the current sensor is configured to sense the output current for the first reference period of time when a predetermined period of time has elapsed from a start of the forward or backward rotation of the motor.

5. The vehicle of claim 2, wherein the controller is configured to determine that the output of the motor has been short-circuited when the output current sensed for a predetermined second reference period of time is greater than or equal to a predetermined second reference current during forward or backward rotation of the motor.

6. The vehicle of claim 5, wherein the first reference period of time is greater than the second reference period of time, and the first reference current is less than the second reference current.

7. The vehicle of claim 1, wherein the seat jamming is a state in which an object is caught with the seat when the seatback is folded or unfolded, and the short-circuit of the output of the motor is a state in which a circuit of the motor for outputting a current is short circuited.

8. The vehicle of claim 1, wherein the controller is configured to:
   operate the motor to return the seatback to an original position before the motor operates in response to determining that the seat jamming has occurred during forward or backward rotation of the motor; and
   stop the motor in response to determining that the seat jamming has occurred during a return of the seatback to the original position.

9. The vehicle of claim 1, further comprising:
   a switch configured to receive an input related to a folding command or an unfolding command of the seatback.

10. A method of controlling a vehicle, comprising:
    receiving, by a controller, an input related to a folding command or an unfolding command of a seatback of a seat;
    sensing, by the controller, an output current of a motor rotating forward or backward to fold the seatback toward a seat cushion or unfold the seatback from the seat cushion;
    determining, by the controller, a seat jamming or a short-circuit of an output of the motor based on a magnitude of the output current sensed for a predetermined period of time during forward or backward rotation of the motor;
    in response to determining that the output of the motor has been short circuited, stopping, by the controller, the motor; and
    in response to determining that the seat jamming or the short circuit of the output of the motor has occurred, emitting, by the controller, an alert signal through an alert screen or by flickering the seat.

11. The method of claim 10, wherein the determining of the seat jamming includes:
    determining, by the controller, that the seat jamming has occurred when the output current sensed for a predetermined first reference period of time is greater than or equal to a predetermined first reference current during forward or backward rotation of the motor.

12. The method of claim 11, wherein the determining of the seat jamming includes:
    determining, by the controller, a predetermined magnitude of load to be generated in a direction opposite to a direction in which the motor rotates forward or backward when the output current sensed for the predetermined first reference period of time is greater than or equal to the predetermined first reference current during forward or backward rotation of the motor; and
    determining, by the controller, that the seat jamming has occurred based on the generated load.

13. The method of claim 11, wherein the sensing of the output current of the motor includes sensing, by the controller, the output current for the first reference period of time when a predetermined period of time has elapsed from a start of the forward or backward rotation of the motor.

14. The method of claim 11, wherein the determining of the short-circuit of the output of the motor includes:
   determining, by the controller, that the output of the motor has been short-circuited when the output current sensed for a predetermined second reference period of time is greater than or equal to a predetermined second reference current during forward or backward rotation of the motor.

15. The method of claim 14, wherein the first reference time is greater than the second reference time, and the first reference current is less than the second reference current.

16. The method of claim 10, wherein the motor is operated to return the seatback to an original position before the motor operates, in response to determining that the seat jamming has occurred during forward or backward rotation of the motor; and the motor is stopped in response to determining that the seat jamming has occurred during a return of the seatback to the original position.

* * * * *